United States Patent
Basheer et al.

(10) Patent No.: US 7,754,824 B2
(45) Date of Patent: Jul. 13, 2010

(54) DENDRITIC POLYOL, CYCLOALIPHATIC EPOXY RESIN AND CATIONIC INITIATOR

(75) Inventors: Rafil A. Basheer, Rochester Hills, MI (US); Derek B. Workman, Noblesville, IN (US); Arun K. Chaudhuri, Carmel, IN (US); Mohamed Bouguettaya, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/267,157

(22) Filed: Nov. 7, 2008

(65) Prior Publication Data

US 2009/0082528 A1 Mar. 26, 2009

Related U.S. Application Data

(62) Division of application No. 11/121,206, filed on May 3, 2005, now abandoned.

(51) Int. Cl.
*C08L 63/00* (2006.01)
(52) U.S. Cl. ...................... 525/438; 525/407
(58) Field of Classification Search ........................ None
See application file for complete search history.

(56) References Cited

U.S. PATENT DOCUMENTS

| 5,418,301 | A | 5/1995 | Hult et al. |
|---|---|---|---|
| 6,093,777 | A | 7/2000 | Sorensen et al. |
| 6,774,250 | B1 | 8/2004 | Hatton et al. |
| 2004/0106769 | A1 | 6/2004 | Hatton et al. |
| 2005/0126697 | A1* | 6/2005 | Kuczynski ............... 156/275.7 |

FOREIGN PATENT DOCUMENTS

| JP | 58-37004 | A | * | 3/1983 |
|---|---|---|---|---|
| JP | 59-199712 | | | 11/1984 |
| JP | 60-84303 | A | * | 5/1985 |
| JP | 2-252765 | A | * | 10/1990 |
| JP | 10-120766 | A | * | 5/1998 |
| JP | 2002-256057 | A | * | 9/2002 |

| WO | 02/070582 | A1 | 9/2002 |
|---|---|---|---|

OTHER PUBLICATIONS

Sangermano M., et al., "Investigation on the effect of the presence of hyperbranched polymers on thermal and mechanical properties of an epoxy UV-cured system," Polymer International, vol. 54, Feb. 15, 2005, XP-002396540, pp. 917-921.
"Boltorn Dendritic Polymers" Brochure, 12 pages, 2008.
CAS registry No. 25085-97-7 for Cyracure UVR 6100, 3,4-epoxycyclohexylmethyl-3,4-epoxycyclohexanecarboxylate, 1993, two pages.
Hong, X. et al., HCAPLUS Accession No. 2001:24452 for Chinese Patent No. 1,252,413, May 10, 2000, one page.
Sangermano, M. et al., "Phenolic Hyperbranched Polymers as Additives in Cationic Photopolymerization of Epoxy Systems," Macromolecular Materials and Engineering, 2004, vol. 289, pp. 442-446.
Hong, X. et. al., "Synthesis and Characterization of a Hyperbranched Polyol with Long Flexible Chains and Its Application in Cationic UV Curing," Journal of Applied Polymer Science, vol. 77, 2000, pp. 1353-1356.
Alm, Roger R., "Use of amine-blocked trifluoromethanesulfonic acid catalysts and fluorochemical surfactants to develop one-part, epoxy-based, high solids thermoset coatings," HCAPLUS Accession No. 1981:588689 for the Proceedings of the Water-Borne and Higher-Solids Coatings Symposium article, 1981, 8th(1), three pages.
Mezzenga, R. et al., "A review of dendritic hyperbranched polymer as modifiers in epoxy composites," Composites Science and Technology, vol. 61, 2001, pp. 787-795.
James, D., Advanced Polyols and Dendritic Polymers for Radiation Curing: Allying Improved Performances with Safety and Environmental Compliance, Parquet Coating II, European Coating Conference, Nov. 14, 2002, Berlin, Germany, 13 pages.
James, D., Unique Characteristics of a Dendritic Polyether for Radiation Curing, PRA Radcure Coatings and Inks, Jun. 24, 2002, Manchester, UK, 10 pages.
Boogh, L. et al., "Dendritic hyperbranched polymers as tougheners for epoxy resins," Polymer, vol. 40, 1999, pp. 2249-2261.

* cited by examiner

*Primary Examiner*—Robert Sellers
(74) *Attorney, Agent, or Firm*—Jimmy L. Funke

(57) ABSTRACT

The present invention relates to rigid and clear thermosetting compositions formed from dendritic or hyperbranched polymers and cylcoaliphatic epoxy resins. The compositions may be used for coatings such as electronic device packaging, adhesives, wire coatings, and finishes.

1 Claim, 1 Drawing Sheet

DENDRITIC POLYOL, CYCLOALIPHATIC EPOXY RESIN AND CATIONIC INITIATOR

CROSS-REFERENCE TO RELATED APPLICATION

This application is a Divisional of U.S. patent application Ser. No. 11/121,206, entitled "HYPERBRANCHED POLYMER AND CYCLOALIPHATIC EPOXY RESIN THERMOSETS," filed on May 3, 2005, abandoned, the entire disclosure of which is incorporated herein by reference.

FIELD OF THE INVENTION

The present invention relates to rigid and clear thermosetting compositions formed from dendritic or hyperbranched polymers and cylcoaliphatic epoxy resins. The compositions may be used for coatings such as electronic device packaging, adhesives, wire coatings, and finishes.

BACKGROUND OF THE INVENTION

Known commercial thermoset resins from dendritic polymers such as acrylate and urethane thermosets have excellent processing and reactivity characteristics when compared to their linear polymer analogs due to their globular structure and high density of reactive functionalities. However, such thermoset materials may not be suitable for a wide range of electrical and electronic applications due to low thermal stability and moderate electrical properties. On the other hand, epoxy functionalized dendrimers have received little commercial success due to rheological issues associated with their extreme viscosities.

Dendritic polymers are a relatively new class of macromolecules with a hyperbranched structure formed from the incorporation of repetitive branching sequences by a multiplicative growth process beginning with a small molecule. As such, dendrimers typically consist of a core, from which branches extend in three-dimensions, forming a globular structure with a large number of end groups at the peripheral surface. Consequently, dendrimers differ significantly from conventional linear polymers in their physical properties. Their compact globular structure coupled with the absence of restrictive interchain entanglements results in low viscosities that are substantially lower than their linear polymer analogues of similar molecular weights as disclosed in "Properties and Applications of Dendritic Polymers", B. Pettersson, Pyramid Communication AB, Sweden, 2001, and by R. Mezzenga, L. Boogh, and J. E. Manson, Composite Science and Technology, 61, 787, 2001, the disclosure of each expressly incorporated by reference herein. Furthermore, the variability in the chemical compositions of the core molecule, the chain extender, and the high density terminal groups allow for solubilities in a large variety of solvents.

To date, only a few dendritic polymers have been successfully commercialized. Among the commercial hyperbranched polymers are those that are based on polyalcohol and an aliphatic tertiary polyester backbone such as the structure shown in FIG. 1. They are sold under the trade name Boltorn™ by the Perstrop Specialty Chemicals (Boltorn is a trademark of Perstrop Specialty Chemicals). Most of the commercial applications of this family of dendritic polymers rely on the exceptionally high concentration of reactive hydroxyl groups that provide for a rapid curing in thermosetting applications. The most prominent applications are in the coating and in the polyurethane industries as discussed by D. James in the article "Parquet Coating II," at the European Coating Conference, 14 Nov. 2002, the disclosure of which is expressly incorporated by reference herein. Currently, different Boltorn™ product grades are used by the radiation curable coating, the powder coating, the decorative coating, and the polyurethane industries in both automotive and non-automotive applications as discussed by D. James in PRA Radcure Coatings and Inks, 24 Jun. 2002, the disclosure of which is expressly incorporated by reference herein.

Although the application of dendritic polymers in epoxy resin compositions has been reported by L. Boogh, B. Pettersson, and J. E. Manson in Polymer, 40, 2249, 1999, the disclosure of which is expressly incorporated by reference herein, their utility in these instances is limited to their phase separation-induced toughening effect in the Bisphenol-A family type of epoxy resins that are cured by non-cationic initiation. Functionalization of the dendritic polymer with epoxy groups has also been reported and some commercial grades are available.

SUMMARY OF THE INVENTION

One embodiment of the present invention includes a coating comprising a dendritic polyol, a cycloaliphatic epoxy resin, and a cationic initiator. The coating may include a cycloaliphatic epoxy resin selected from the group consisting essentially of 3,4-epoxycyclohexyl methyl-3,4-epoxy-cyclohexane carboxylate, bis(3,4-epoxycyclohexyl) adipate, and 2-(3,4-epoxycyclohexyl-5,5-spiro-3,4-epoxy) cyclohexane-meta-dioxane, a dendritic polyol selected from the group consisting essentially of Boltorn H20, Boltorn H30, Boltorn H40, Boltorn H2003, and Boltorn H2004, and/or an initiator selected from the group consisting essentially of FC520, Cp66, Nacure XC 7231, and Nacure super A218.

Another embodiment of the present invention includes a process of coating metal with an electrical insulator, the process including the steps of providing a mixture of a dendritic polyol, a cycloaliphatic epoxy resin, and a cationic initiator, coating the metal with the mixture, and heating the mixture. The electrical insulator may include a cycloaliphatic epoxy resin selected from the group consisting essentially of 3,4-epoxycyclohexyl methyl-3,4-epoxy-cyclohexane carbonate, bis(3,4-epoxycyclohexyl) adipate, and 2-(3,4-epoxycyclohexyl-5,5-spiro-3,4-epoxy) cyclohexane-meta-dioxane, a dendritic polyol selected from the group consisting essentially of Boltorn H20, Boltorn H30, Boltorn H40, Boltorn H2003, and Boltorn H2004, and/or an initiator selected from the group consisting essentially of FC520, Cp66, Nacure XC 7231, and Nacure super A218.

Another embodiment of the present invention includes a composition of matter comprising a dendritic polyol, a cycloaliphatic epoxy resin, and a cationic initiator. The composition of matter may include a dendritic polyol comprising about 5-30% by weight of the composition. The composition of matter may also include a dendritic polyol comprising about 10-20% by weight of the composition. The composition of matter may also include a cationic initiator comprising about 0.1-3.0% by weight of the composition.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
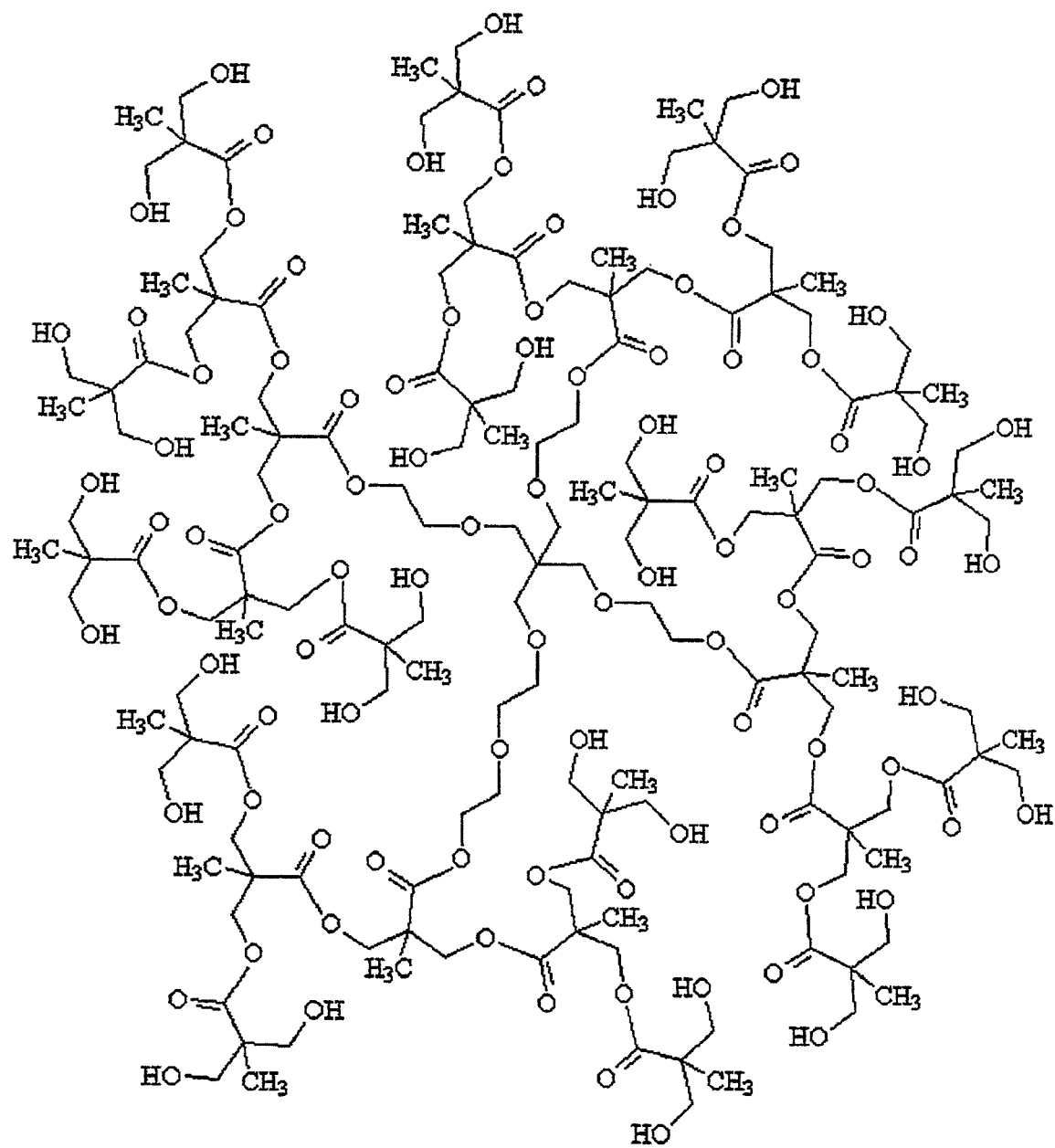
FIG. 1 is a structural diagram a hyperbranched or dendritic polyol such as Boltorn™.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DETAILED DESCRIPTION OF THE INVENTION

The embodiments discussed below are not intended to be exhaustive or limit the invention to the precise forms disclosed in the following detailed description. Rather, the embodiments are chosen and described so that others skilled in the art may utilize their teachings.

The present invention includes the a series of thermoset compositions formed from the combination of cycloaliphatic epoxy resins and dendritic polyols and the method or making such compositions. The resulting thermoset compositions have the superior processing and high reactivity characteristics of the multifunctional globular structure of the dendritic polyols and the excellent thermal degradation resistance and electrical properties known for cycloaliphatic/polyol based compositions. As discussed below, the combination of hyperbranched or dendritic polyols with a variety of cycloaliphatic epoxy resins shows excellent reactivities at temperatures as low as 80° C. and high thermal degradation temperatures, greater than 400° C., when catalyzed by certain initiators. Also, cycloaliphatic/polyol based compositions are known to have good outdoor weathering, superior arc-track resistance, good dielectric properties, and low ionic contents. The thermoset compositions of the present invention are moderately tough, clear systems and can be used in the encapsulation of electronics where transparency or "see-through" is important.

The thermoset compositions of the present invention are made by dissolving polyalcohol based dendrimers, such as the Boltorn™ family, in cycloaliphatic epoxy resins by heating at a temperature in the range of 80° C.-120° C. The resulting mixture remains after cooling to room temperature. Next, a specific amount of a cationic initiator is added at a specified temperature to cure the mixture. Examples of the this method are described below. The resulting thermoset compositions have excellent rigid and transparent characteristics. Another feature of the present invention is the pot life of the mixture including a polyalcohol based dendrimer, a cycloaliphatic epoxy resin, and a cationic initiator. This one-package mixture may be stored at room temperature for several months. The mixture may then be used, for example as a coating. Heat is applied to the mixture to activate the cationic initiator may cure the mixture leaving the thermoset coating.

EXAMPLES

The structure and properties of the dendritic polyols, the cycloaliphatic epoxy resins, and the cationic initiators used in the formulations of the following examples of the present invention are given in Tables I, II, and III. Table I illustrates the structure of the cycloaliphatic epoxy resins used in these examples. In the examples described below, three different cycloaliphatic epoxy resins, 3,4-epoxycyclohexyl methyl-3,4-epoxycyclohexane carboxylate, bis(3,4-epoxycyclohexyl) adipate, and 2-(3,4-epoxycyclohexyl-5,5-Spiro-3,4-epoxy) cyclohexane-meta-dioxane, all produced by Dow Chemical, are used. Table II lists the cationic initiators used in these examples along with their approximate structures and their respective manufacturers. The cationic initiators used in the examples described below include FC520, Cp66, Nacure XC 7231, and Nacure super A218. Table III lists characteristics of several different generations of dendrimers of Boltorn™ polyols used in these examples. The dendrimers include Boltorn™ H20, H30, H40, H2003, and H2004.

TABLE I

Structure of Cycloaliphatic Epoxy Resins (Dow Chemical Co.) used in the Formulations

| Code | Name | Structure | EEW* |
|---|---|---|---|
| ERL4221 | 3,4-epoxycyclohexyl methyl-3,4-epoxy-cyclohexane carboxylate | | 136 |
| ERL4299 | Bis(3,4-epoxycyclohexyl) adipate | | 200 |
| ERL4234 | 2-(3,4-epoxycyclohexyl-5,5-Spiro-3,4-epoxy) cyclohexane-meta-dioxane | | 144 |

*EEW: Epoxy Equivalent Weight

TABLE II

Cationic Initiators and Approximate Structures

| Cationic Initiator | Structure | Manufacturer |
|---|---|---|
| FC520 | Diethyl ammonium triflate | 3M |
| Cp66 | S-butenethiophene hexafluoroantimonate | Asahi Denka |
| Nacure XC 7231 | Ammonium hexafluoroantimonate | King Industries |
| Nacure super A218 | Lewis acid (zinc salt) | King Industries |

TABLE III

Characteristics of Different Generation Dendrimers of Boltorn ™ Polyols

| Product | H20 | H30 | H40 | H2003 | H2004 |
|---|---|---|---|---|---|
| Hydroxyl number | 505 | 495 | 485 | 298 | 125 |
| Mw (g/mole) | 1750 | 3570 | 7250 | 2500 | 3200 |
| Functionality | 16 | 32 | 64 | 12 | 6 |
| Viscosity at 110° C. (×10$^{-3}$) | 7 | 40 | 110 | 1 | 20 |

In the following examples, the formulations of the dendrimer/epoxy mixture were prepared by dissolving an appropriate amount of the dendritic polyol in the cycloaliphatic epoxy resin at about 100° C. The dendritic polymers remained in solution for months after cooling to room temperature. The amount of dissolved dendrimers in the epoxy resin is limited by solubility and by viscosity requirements. Concentrations are in the range of 5-30% by weight of the dendrimer polyol and further concentrations are in the range of 10-20% by weight. As discussed below, non-dendritic polyols may be added to the mixture to reduce the viscosity or to impart desirable characteristics of the non-dendritic polyols to the cured thermoset.

Curing of the dendrimer/epoxy solutions was achieved by the addition of one of the cationic initiators listed in Table II. After one of the initiators is added to the dendrimer/epoxy solution, the formulation was heated to a required temperature for an appropriate time period. The preferred amount of cationic initiator is between 0.1-3.0% by weight of the total composition. The optimum amount varies with the type of initiator. Some initiators, such as FC520 and Nacure XC7231, cause coloration of the cured formulations when used at relatively high concentrations (3% by weight). Excessive cure exotherms and lower degradation temperatures of the cured products are other concerns for formulations involving high initiator concentrations.

Table IV (shown below) illustrates the influence of the concentration of the cationic initiator, Nacure A218 in this example, on the cure temperature ($T_{max}$ ° C.) for three different mixtures of dendrimer/epoxy solution. The cure temperature of each formulation depends on the specific initiator and its concentration. For the examples shown in Table IV, each of the three formulations includes about 15% dendrimer and about 85% cycloaliphatic epoxy resin. The three formulations tested are mixtures of Boltorn H20 and ERL4234, Boltorn H40 and ERL4234, and Boltorn H20 and ERL4221, respectively. The cationic initiator used was Nacure A218. For each of the three formulations of dendrimer and cycloaliphatic epoxy resin, three different concentrations of Nacure A218 were added. The cure temperature was determined from the peak maxima of differential scanning calorimetry (DSC) measurements. The three concentrations of Nacure A218 used for the Boltorn H20/ERL4234 and Boltorn H40/ERL4234 formulations were 0.25, 0.5, and 1.0 percent by weight of the mixture. Concentrations of 0.5, 1.0, and 3.0 percent by weight of the mixture were added to the Boltorn H20/ERL4221 formulations. As shown in Table IV, the formulations having the lower concentrations of initiator required a higher cure temperature.

TABLE IV

The Influence of Initiator (Nacure A218) Concentration on $T_{max}$

| Dendrimer/Epoxy (15/85% w/w) | Concentration of Initiator (% wt) | $T_{max}$, ° C. |
|---|---|---|
| Boltorn H20/ERL4234 | 0.25 | 148 |
| Boltorn H20/ERL4234 | 0.5 | 142 |
| Boltorn H20/ERL4234 | 1.0 | 133 |
| Boltorn H40/ERL4234 | 0.25 | 154 |
| Boltorn H40/ERL4234 | 0.5 | 147 |
| Boltorn H40/ERL4234 | 1.0 | 133 |
| Boltorn H20/ERL4221 | 0.5 | 161 |
| Boltorn H20/ERL4221 | 1.0 | 148 |
| Boltorn H20/ERL4221 | 3.0 | 114 |

Table V (shown below) illustrates the cure temperatures ($T_{max}$ ° C.) of a formulation including Boltorn H20 and ERL4221 in a 15:85% weight to weight ratio using four different initiators. The cure temperatures were determined for each of the four initiators for formulations having a concentration of initiator of about 1% and about 3% by weight of the mixture. Tables IV and V illustrate a set of optimum cure temperatures as a function of the initiator and its concentration for representative formulations. The broad range of curing temperatures ($T_{max}$) obtained from the different initiators allows for thermoset applications having different process temperature requirements. As should be obvious from the foregoing, a variety of cationic initiators could be used in a variety of concentrations to yield the desired cure temperature and thermoset characteristics.

TABLE V

Cure Temperatures ($T_{max}$) of Boltorn H20/ERL4221 (15:85% w/w) Formulations Using Different Initiators

| Initiator | $T_{max}$ (° C.) at 1% wt** | $T_{max}$ (° C.) at 3% wt** |
|---|---|---|
| XC7231 | 117 | 98 |
| A218 | 148 | 114 |
| FC520 | 180 | 149 |
| Cp6 | 126 | — |

*Cure temperature at maximum of exothermic peak (from DSC)
**Concentration of initiator Table VI (shown below) compares the cure temperature ($T_{max}$ ° C.) for formulations having different epoxy resin and cationic initiators. The initiators, Nacure A218 and Nacure XC7213, are about 1% by weight of the dendrimer/epoxy solution. Table VII compares formulations having different dendritic polyols and a single epoxy resin. In all of the examples listed in Table VII, the cycloaliphatic epoxy resin was ERL4221. The ERL4221 was combined with the dendritic polymers Boltorn H20, H40, H2003, and H2004 to four different dendrimer/epoxy solutions. Each of the dendrimer/epoxy solutions were divided into three groups. Nacure XC7231 at a concentration of about 3% by weight of the solution was added to each of the solutions in the first group. Nacure XC7231 at a concentration of about 1% by weight of the solution was added to each of the solutions in the second group. FC520 at a concentration of about 1% by weight of the solution was added to each of the solutions in the third group.

The measurements of Tables VI and VII indicate that the reaction or cure temperature ($T_{max}$) depends on the type of epoxy resin but is independent of the dendrimer generation.

TABLE VI

Dependence of $T_{max}$ on the Type of Cycloaliphatic Epoxy Resin for Boltorn H20/Epoxy (15:85% w/w) Formulations

| Initiator at 1% concentration | Epoxy resin | $T_{max}$ (° C.) |
|---|---|---|
| Nacure A218 | ERL4299 | 123 |
| Nacure A218 | ERL4221 | 148 |
| Nacure A218 | ERL4234 | 133 |
| Nacure XC7213 | ERL4299 | 110 |
| Nacure XC7213 | ERL4221 | 117 |
| Nacure XC7213 | ERL4234 | 110 |

TABLE VII $T_{max}$ as a Function of Boltorn Dendrimer Generation in Formulations with ERL4221

| Dendritic Polymer | Initiator | Concentration of Initiator (wt %) | $T_{max}$ (° C.) |
|---|---|---|---|
| Boltorn H20 | Nacure XC7231 | 3 | 101 |
| Boltorn H40 | Nacure XC7231 | 3 | 108 |
| Boltorn H2003 | Nacure XC7231 | 3 | 98 |
| Boltorn H2004 | Nacure XC7231 | 3 | 102 |
| Boltorn H20 | Nacure XC7231 | 1 | 117 |
| Boltorn H40 | Nacure XC7231 | 1 | 121 |
| Boltorn H2003 | Nacure XC7231 | 1 | 113 |
| Boltorn H2004 | Nacure XC7231 | 1 | 117 |
| Boltorn H20 | FC520 | 1 | 180 |
| Boltorn H40 | FC520 | 1 | 178 |
| Boltorn H2003 | FC520 | 1 | 184 |
| Boltorn H2004 | FC520 | 1 | 186 |

Non-dendritic polyols may also be incorporated in the formulations to achieve certain desirable properties for the cured thermoset. For example, flexible polyols may be added to improve the impact resistance or to provide for a flexible thermoset products. The addition of non-dendritic polyols at the ratio of 1:2 (non-dendritic:dendritic polyols by weight) did not significantly change the cure temperature of the compositions. Representative examples are given in Table VIII.

TABLE VIII

Comparison of Cure Temperatures in Formulations with and without Linear Polyols

| Dendrimer/Epoxy (15%/85% by weight) | $T_c^1$ (° C.) | $T_{cl}^1$ (° C.) | Initiator at 1% by weight | Non-dendritic Polyol |
|---|---|---|---|---|
| Boltorn H20/ERL4299 | 110 | 117 | XC7231 | BPAE[2] |
| Boltorn H20/ER4221 | 148 | 154 | A218 | BPAE |
| Boltorn H20/ERL4299 | 117 | 124 | XC7231 | BPAE |
| Boltorn H20/ER4221 | 117 | 121 | XC7231 | PTHF[3] |

[1]$T_c$ and $T_{cl}$ are the cure temperatures for formulations containing dendrimer only and linear polyol, respectively.
[2]BPAE is Bisphenol-A ethoxylate (4 ethoxylate/phenol, Mn = 580); at 2:1 Boltorn/BPAE by weight.
[3]Polytetrahydrofuran (Mn = 250); at 2:1 Boltorn/PTHF by weight.

As shown in Table VIII, the addition of BPAE and PTHF to several dendrimer/epoxy solutions did not significantly effect the cure temperature of the solutions when the cationic initiator was added. In addition to BPAE and PTHF, other suitable non-dendritic polyols or mixtures of non-dendritic polyols could be added to a dendrimer/epoxy/cationic initiator solution to produce a thermoset having a variety of desired characteristics.

TABLE IX

Decomposition Temperature in Air Atmosphere for Representative Formulations

| Dendrimer/Epoxy (15/85% w/w) | Initiator | Initiator Concentration (wt %) | $T_d^1$ (° C.) |
|---|---|---|---|
| Boltorn H20/ERL4299 | XC7231 | 1 | 420 |
| Boltorn H20/ERL4299 | XC7231 | 3 | 414 |
| Boltorn H20/ERL4299 | XC7231 | 0.5 | 424 |
| Boltorn H40/ERL4221 | XC7231 | 1 | 390 |
| Boltorn H20/ERL4299 | Cp66 | 0.5 | 418 |
| Boltorn H20/ERL4299 | FC520 | 0.5 | 358 |
| Boltorn H20/ERL4221 | FC520 | 0.5 | 335 |
| Boltorn H40/ERL4221 | FC520 | 0.5 | 323 |
| Boltorn H2004/ERL4221 | FC520 | 0.5 | 326 |
| Boltorn H20/ERL4221 | A-218 | 1 | 311 |
| Boltorn H20/ERL4299 | A-218 | 0.5 | 317 |
| Boltorn H40/ERL4234 | A-218 | 0.25 | 315 |

[1]$T_d$ is the decomposition temperature in air as measured at 5% weight loss by thermogravimetric analysis.

The investigated dendritic polyol/cycloaliphatic epoxy compositions show good thermal stability in air. The decomposition temperatures as measured by thermogravimeteric analysis for some of the examples of the dendrimer/epoxy/initiator mixtures are given in Table IX. Compositions cured with Nacure XC7231 or with Cp66 showed the highest decomposition temperatures, greater than 400° C., in an air atmosphere. The concentration of any of the initiators tested to achieve the highest decomposition temperatures is in the range of 0.25-1% by weight of total composition and a further concentration is in the range of 0.5-0.75% by weight.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A thermally curable composition consisting essentially of:
   from about 10% to about 20% by weight of a dendritic polyol having a molecular weight of from 1,750 to 7,250; a hydroxyl functionality of from 6 to 64, and a hydroxyl number of from 125 to 505;
   from 0.25% to 1.0% by weight of an initiator consisting of S-butenethiophene hexafluoroantimonate and ammonium hexafluoroantimonate;
   optionally, a non-dendritic polyol in an amount of up to half the amount by weight of the dendritic polyol; and
   at least one cycloaliphatic epoxy resin comprising the balance of the composition;
   wherein the cured composition has a decomposition temperature greater than 400° C. in an air atmosphere and is transparent.

* * * * *